(No Model.) 3 Sheets—Sheet 3.
S. V. REHART & T. E. BERNARD.
COMBINED RAKE AND HAY LOADING MACHINE.
No. 548,593. Patented Oct. 22, 1895.
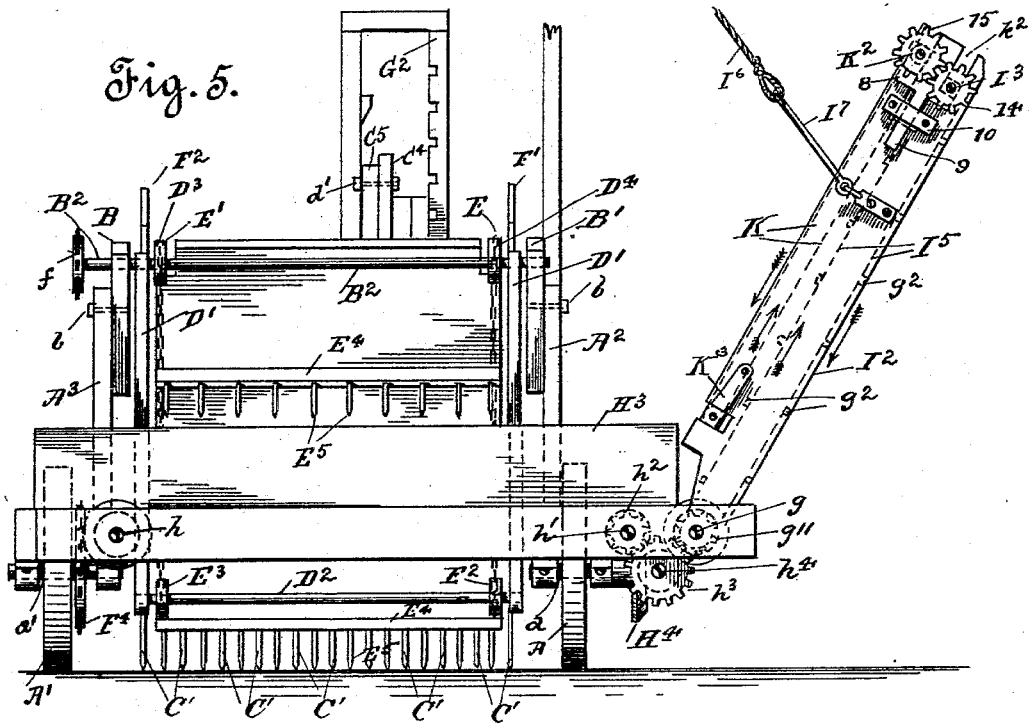
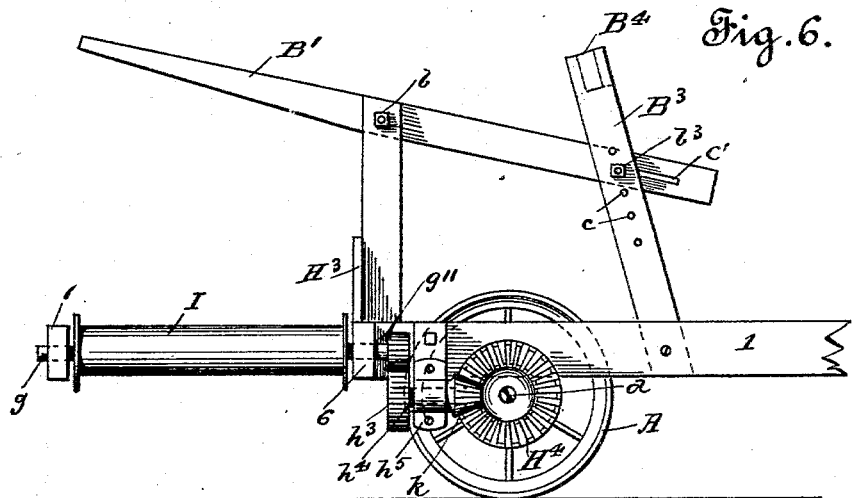
Witnesses.
Inventors
Solomon V. Rehart
Thomas E. Bernard

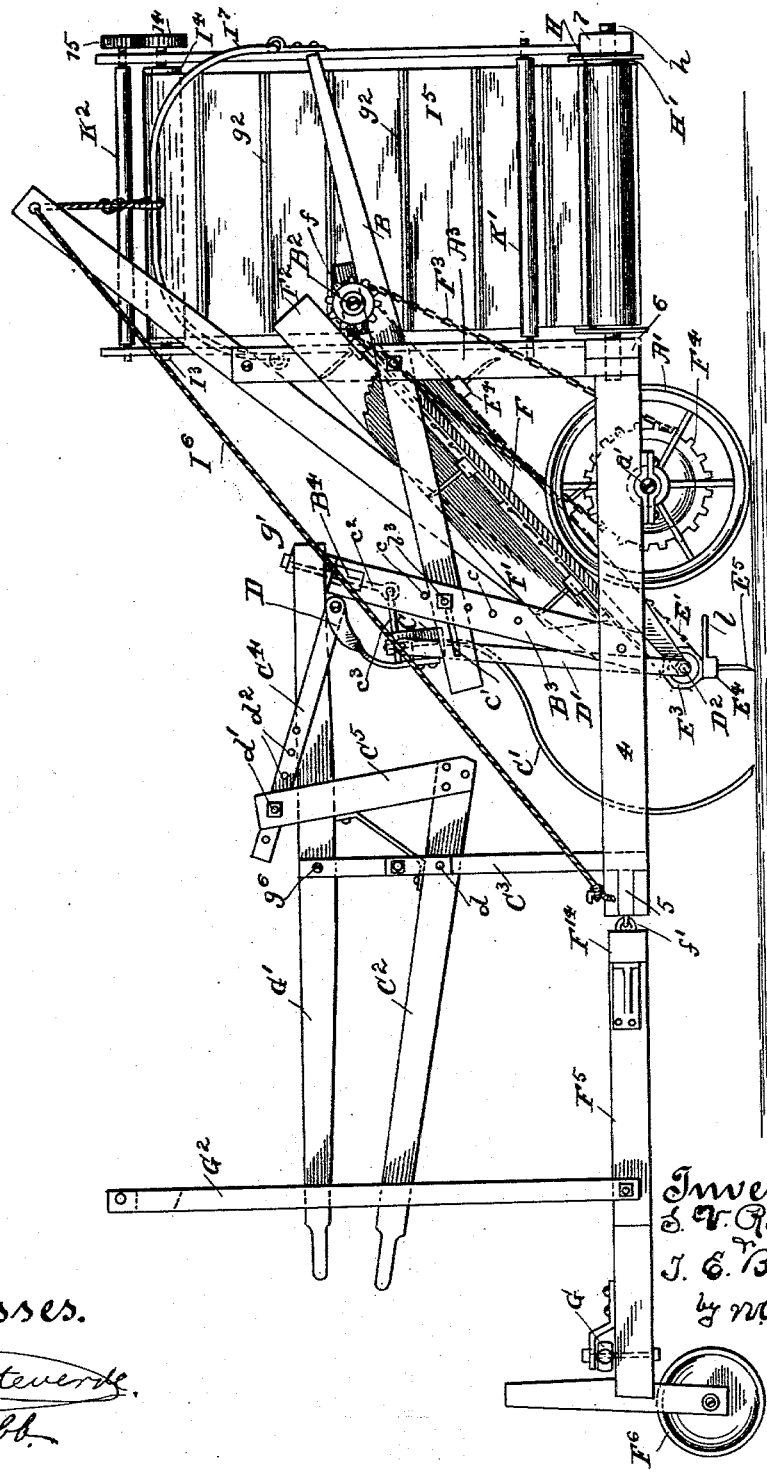

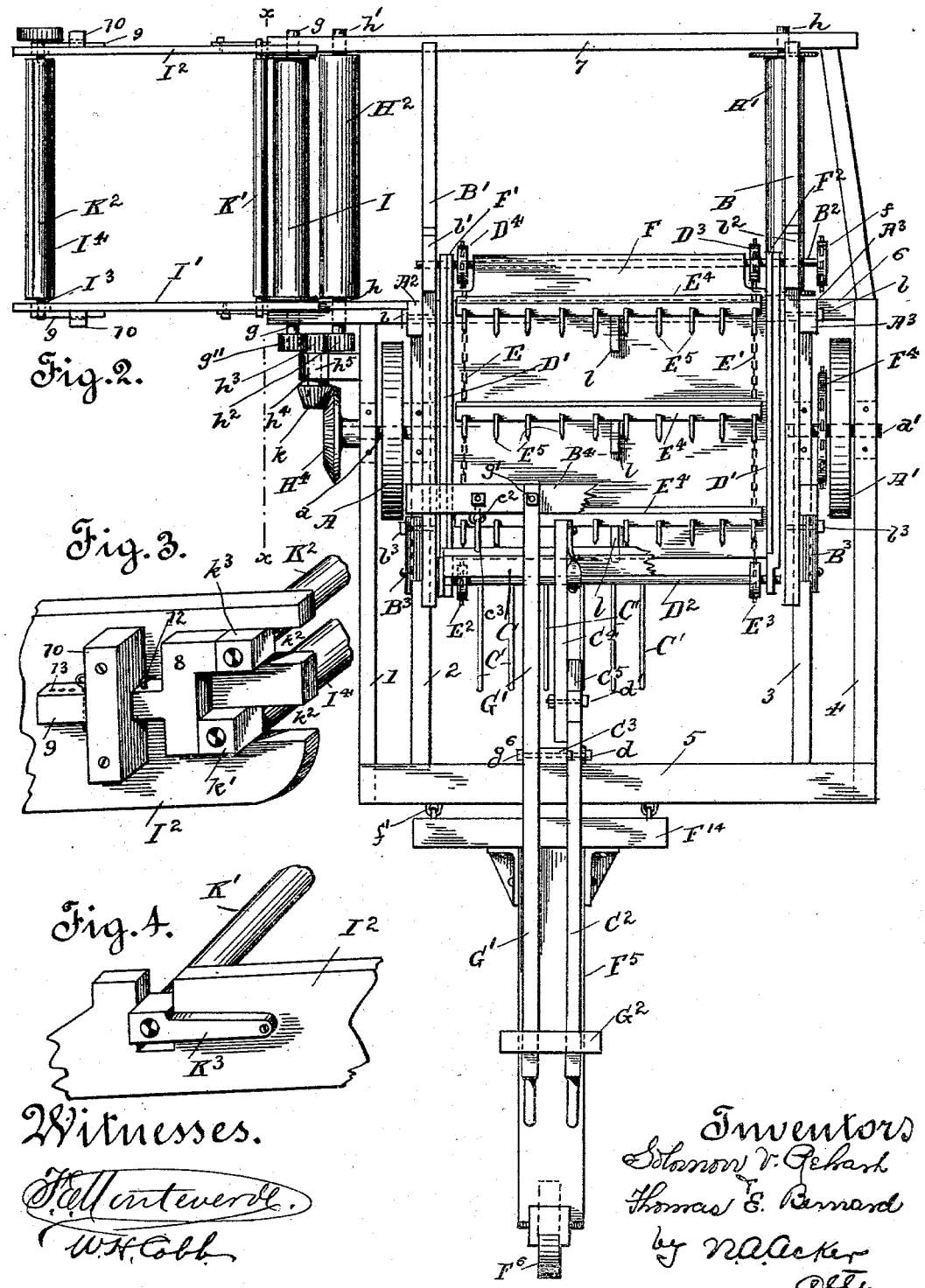

UNITED STATES PATENT OFFICE.

SOLOMON V. REHART AND THOMAS E. BERNARD, OF LAKE VIEW, OREGON; SAID BERNARD ASSIGNOR TO SAID REHART.

COMBINED RAKE AND HAY-LOADING MACHINE.

SPECIFICATION forming part of Letters Patent No. 548,593, dated October 22, 1895.

Application filed January 7, 1895. Serial No. 534,161. (No model.)

*To all whom it may concern:*

Be it known that we, SOLOMON V. REHART and THOMAS E. BERNARD, citizens of the United States, residing at Lake View, in the county of Lake and State of Oregon, have invented certain new and useful Improvements in a Combined Rake and Hay-Loading Machine; and we do hereby declare the following to be a full, clear, and exact description of said invention, such as will enable othesr skilled in the art to which it most nearly appertains to make, use, and practice the same.

Our present invention relates to a certain new and useful combined hay rake and loader, which consists in the arrangement of parts and details of construction, as will be hereinafter more fully set forth in the drawings and described and pointed out in the specification.

The object of our invention is to provide a combined rake and loader whereby the hay will be taken from the rake and delivered to an endless conveyer, which carries the same at a right angle and feeds the same to a wagon located at one side of the rake, thereby permitting us to load the wagon while traveling along the side of the rake. By this means of loading the wagon we are enabled to dispense with considerable help now required to load the wagons and at the same time create a great saving in time over the ordinary manner of loading the hay onto the wagon or where the rake is attached to the rear of the wagon to be loaded; because, when the rake is thus secured it is necessary, when the wagon is loaded with the hay, that the working of the rake be stopped until the loaded wagon is detached from the rake and another or empty wagon coupled. By this manner of loading the hay onto the wagon the same is necessarily delivered at one end and it must be distributed as deposited upon the wagon by means of help especially provided for this purpose.

By our combined rake and loader the hay is delivered at right angles to the wagon while the latter is traveling beside the rake. Consequently as the hay is deposited upon the wagon it is only necessary in order to properly load the same that the driver thereof see that the wagon is kept even with the loader.

By the use of our machine it is not necessary to stop and uncouple the loaded wagon and attach the rake to an empty one but the driver of a loaded wagon drives away to the barn or other place of deposit with the loaded wagon and another or empty wagon takes the place of the loaded wagon. Our machine may thus be said to be a combined rake and side loader.

In order to fully understand our invention, reference must be had to the accompanying sheets of drawings, forming a part of this specification, wherein—

Figure 1 is a view in side elevation of the complete machine. Fig. 2 is a top plan view of the machine. Fig. 3 is an enlarged detail perspective view of upper end of the feed-chute, showing device for tightening the conveyer or elevator belts. Fig. 4 is a similar view as Fig. 3 of the lower end of the feed-chute. Fig. 5 is a front elevation of the machine, and Fig. 6 is a broken detail view in side elevation showing the drive mechanism for the conveyer belts or aprons.

The main frame of our machine consists of the side pieces 1 2 3 4 and the cross end pieces 5 and 6. Between the side pieces 1 2 and 3 4 we locate the wheels A A', which are mounted upon short axles $a$ $a'$, which work in suitable bearing-boxes secured to the side pieces.

To the forward end of the main frame we secure the uprights $A^2$ $A^3$, to which uprights we secure by bolts $b$ the forwardly-extending levers B B'. These levers carry the bearing-boxes $b'$ $b^2$, within which the cross-shaft $B^2$ works. By means of these fulcrumed levers the cross-shaft $B^2$ may be raised or lowered, so as to move the picker-conveyer hereinafter described from or toward the endless conveyer for the loading-elevator. The fulcrumed levers are held in place by means of the pins $b^3$, which secure the rear end of said levers to the uprights $B^3$, which uprights are secured at their lower end to the main frame, Fig. 1. The pins $b^3$ pass through one of the holes $c$ of the uprights and elongated slot $c'$ of the levers. By simply releasing the pins $b^3$ the outer end of the fulcrumed levers may be raised or lowered, as desired. The uprights $B^3$ are connected at their upper end by cross-beam $B^4$, to which beam is connected the rake-beam C by links $c^2$ $c^3$. From the rake-beam depends the rake-teeth C'. The rake-beam is raised and lowered by means of the lever C², which is fulcrumed to the upright C³ by pin $d$, the forward end of said lever being secured to the rear end of the short link C⁴ by the connecting-piece C⁵, the upper end of said piece being secured to rear end of the short link by pin $d'$, which passes through one of the holes $d^2$ in said lever. By changing the pin $d'$ from one hole to another the stroke of the lever C² may be increased or decreased, as desired. Forward end of link C⁴ is connected to the rake-beam by means of the arm D. Consequently when the rear end of the lever C² is raised the rake-beam, through its connection therewith, is raised so as to raise the rake-teeth farther from the ground, while, when the said lever is lowered, the rake beam and teeth are likewise moved. This raising and lowering of the rake-teeth is necessary in order to permit the taking up of the hay when the machine travels over an irregular surface.

The cross-shaft B² has secured thereon the sprocket-wheels D³ D⁴, one near each end. This cross-shaft is connected to a second or lower cross-shaft D² by means of the endless sprocket-chains E E', which chains travel over the sprocket-wheels D³ D⁴ and sprocket-wheels E³ E², respectively, the sprocket-wheels E² E³ being secured to the cross-shaft D², one near each end thereof. This cross-shaft is suspended from the rake-beam C by means of the straps or pieces D'. Each endless sprocket-chain has connected thereto the cross slats or bars E⁴, to each of which we secure a row of picker-teeth E⁵, which, as carried around, take the raked hay from between the rake-teeth and carry the same upward until carried over the upper cross-shaft B², when it is deposited upon the hereinafter-described conveyer-belt. The sprocket-chains, cross-bars, and teeth may be said to constitute an endless picker elevator or conveyer.

We have found by practical operation that the picker-teeth have a tendency to move backward when carrying a heavy load of hay upward toward the shaft B². This is caused by the sprocket-chains giving or doubling over by taking up the stack. In order to overcome this defect, we provide each cross-slot E⁴ with the rearwardly-extending foot $l$, which, when the picker-teeth are carried toward the cross-shaft B², rests upon the upper face of the platform of the picker-elevator and prevents the picker-teeth turning over backward.

By reference to Fig. 1 it will be noticed that the endless picker elevator or conveyer runs at an angle of about forty-five degrees, although the inclination thereof may be varied by means of the hereinbefore-described levers. In order to prevent sagging of the picker conveyer or elevator and the falling of the hay therethrough, we secure between the endless sprocket-chains the platform F, the upper end of the side pieces F' F² of said platform being connected by hangers or otherwise to the upper cross-shaft B², and the lower end to the cross-shaft D². By thus connecting the platform to the cross-shafts the platform is free to raise and lower with the rise and fall of the endless picker conveyer or elevator. The picker-teeth are arranged so as to just clear the ground during their travel, and inasmuch as they are immediately in front of the rake-teeth it is obvious that all hay held thereby will be carried upward by the picker-teeth as carried around.

Motion is imparted to the sprocket-chains of the picker conveyer or elevator by means of the upper cross-shaft B², which receives its motion during travel of the machine through the medium of the sprocket-chain F³, which travels over the sprocket-pinion $f$, secured to the projecting end of cross-shaft B², and sprocket-wheel F⁴, secured to axle $a'$ of wheel A'.

To the end cross-piece 5 of the main frame is coupled by links $f'$ the cross-piece F¹⁴, to which is secured the rearwardly-extending beam F⁵, which is supported at its outer end by the ground-wheel F⁶. To this beam, near its outer end, we secure by a clevis, king-bolt, or otherwise the whiffletree G, to which the team is attached. We prefer to attach the team to the rear of the rake and push the same forward, for the reason that it enables the driver to see what work is being done by the machine, which he cannot well do in case the rake is secured behind the team. However, this is an immaterial point, as the team may be secured in front or behind, as desired. When the rake is secured in front of the team, the main frame of the machine may be elevated or depressed, so as to raise or lower the picker-teeth, by means of the lever G', which lever is fulcrumed to the upright C³ by pin $g^6$, and the forward end thereof is secured to the cross-beam B⁴ by bolt $g'$. As the outer end of this lever is raised the forward end presses down upon the cross-beam B⁴ and causes the rear portion of the main frame to lower, elevating the forward portion and causing the picker-conveyer to hang at a greater angle. The lowering of the rear end of the lever G' raises the rear portion of the main frame, hence causes the lower end of the picker-elevator to move away from the ground. This adjustment of the picker-elevator during travel of the machine is only required when you change from light to heavy work. At other times the picker-elevator rises and falls with the rake.

The free ends of the levers C² and G' work within the notched guide-standard G², and they are operated by the driver of the machine, whose seat may be upon the beam F⁵ in front of the ground-wheel F⁶, which seat is not shown.

In front of the rake-machine a distance below the cross-shaft B² is located the endless conveyer-belt H, which travels transverse of the machine over rolls H' H², secured upon axles $h\ h'$, which work in bearings of cross-pieces 6 and 7, Figs. 1 and 2. The hay as discharged from the picker elevator or conveyer, as it is carried over the cross-shaft $B^2$, falls upon this endless conveyer or belt and is carried transverse of the machine and delivered to a feed or loading elevator. The hay delivered to said conveyer is prevented from falling off thereof in front of the rake, either by reason of crowding thereon or by the force of the wind, by the guard $H^3$, secured to the uprights $A^2\ A^3$. Should the picker-teeth have a tendency to draw the hay backward after delivering the same to the endless conveyer the same may be raised farther away from or above the conveyer by simply elevating the forward end of the levers $B\ B'$—that is to say, should the hay be deposited in large quantities on the transverse apron the return movement of the teeth would tend to pick portions off and drag it back. To avoid this objection, the upper end of the picker-elevator is permitted to be raised, which will necessarily carry the teeth of the conveyer farther from the hay on the transverse apron. Again, by raising the upper end of the elevator the teeth will assume a greater degree of angularity relative to the transverse apron, so that the hay thereon will naturally slide from the teeth as the later return.

An additional advantage in the adjustable feature of the picker-elevator is in the adjustment of the lower end thereof relative to the rake-teeth, a necessity often occurring where the ground is stony or the hay exceedingly thick.

The endless conveyer-belt is driven by the rotation of the roll $H^2$, which is operated by the axle $h'$, to the inner end of which is secured the pinion $h^2$, which pinion meshes with the teeth of pinion $h^3$, secured to the outer end of axle $h^4$, which works in bearing-box $h^5$. To the inner end of this axle is secured the crown-pinion $k$, the teeth of which intermesh with the crown gear-wheel $H^4$, secured to the axle $a$ of the wheel $A$. As the machine travels the motion of the crown gear-wheel $H^4$ is transmitted to the roll $H'$, so as to drive the endless conveyer through the medium of pinions described.

In front of the roll $H^2$ there is located between the cross-pieces 6 7 the roll I, the axle $g$ of which works in suitable bearing-boxes secured to said cross-pieces. To one end of the axle $g$ is secured the pinion $g''$, which meshes with the teeth of the pinion $h^3$. Consequently the roll I derives its motion in the same manner as roll $H^2$. Upon the axle $g$, between the cross-pieces 6 7 and ends of the roll I, we movably secure the lower end of side pieces $I'\ I^2$ of the feed-elevator. The upper ends of the side pieces we connect by the axle $I^3$, upon which is secured the roll $I^4$. Over the rolls I $I^4$ travels the endless conveyer-belt $I^5$, to the face of which is secured a series of cross strips or slats $g^2$, which hold the hay upon the endless conveyer-belt while being carried upward. This endless conveyer-belt receives the hay from the endless conveyer H, which travels transversely of the machine and conveys the same within the feed-chute toward the wagon to be loaded. As the conveyer-belt is being carried over the rollers $I^4$ the hay held thereon is deposited upon the wagon. This feature of our device constitutes the hay-loader, and, as will be noticed by reference to Figs. 1, 2, and 5, it projects at a right angle to the machine or rake, and hence provides a lateral or side feed. The outer end of the loader or feed-chute is raised and lowered by means of the cable $I^6$, the outer end of which is connected to the feed-chute by means of the bail $I^7$. The free end of the cable is secured to the machine at any suitable point convenient to the driver.

Within the feed-chute we run a second endless conveyer K, which conveyer is designed for assisting the conveyer $I^5$, if necessary, in raising the hay within the feed-chute. This conveyer runs above the conveyer $I^5$ and travels over the small rolls $K'\ K^2$, one secured at each end of the feed-chute. The roll $K'$ is connected at one end to the fulcrumed lever $K^3$, Fig. 4, which permits the roll to raise and lower with the minimum friction. The axle of the roll $I^4$ and journals of roll $K^2$ fit within bearing-boxes $k^3\ k'$, which slide within slots $k^2$ cut in the upper end of the feed-chute, Fig. 3. These bearing-boxes are held in place by the cross-head 8, the stem 9 of which works through the guide-piece 10, secured to the side of the feed-chute. The cross-head is held in its adjusted position by pin 12, which fits through one of the holes 13 of the stem 9. By changing the pin from one hole to another the cross-head 8 may be raised or lowered, so as to tighten or loosen the tension of the conveyer-belts of the loader.

The upper conveyer-belt K is carried around by the rotation of the roll $K^2$, which receives its motion from the roll $I^4$, through the medium of the pinion 14, secured to projecting end of axle $I^3$, intermeshing with pinion 15, secured to journal of roll $K^2$, the roll $I^3$ being rotated by the endless conveyer $I^5$.

As before stated, the loader discharges the hay at right angles to the line of travel of the rake into the wagon to be loaded, and the wagon as loaded drives away and gives place to an empty one. Consequently the delay of coupling and uncoupling wagons is obviated.

Having thus described our invention, what we claim as new, and desire to secure protection in by Letters Patent, is—

1. In a combined hay rake and loader, the combination with the rake beam and its teeth and means for vertically adjusting the same, of a picker elevator in advance of the teeth, link connections directly between the beam and lower end of the picker elevator, and a pivotal connection for the upper end of the elevator, substantially as described.

2. In a combined rake and loader, the combination with the rake teeth and lateral discharge, comprising an endless carrier, of an interposed picker elevator projecting above the carrier, and means for independently adjusting the upper end of the picker elevator to vary the distance between the same and carrier, substantially as described.

3. In a combined rake and loader, the combination with the rake tooth bar and rake teeth and means for raising and lowering the same, of a picker elevator pivotally supported at its upper end, link connections between the lower end of the elevator and rake tooth bar, raising and lowering means for said rake tooth bar, and independent means for adjusting the inclination of the elevator, substantially as described.

4. In a hay rake and loader, the combination with a pivotally supported picker elevator, a rake tooth bar, a lever for raising and lowering the bar, and independent carrying connection from the bar to the lower end of the picker elevator, substantially as described.

5. In a combined rake and loader, the combination with the rake teeth and lateral feed, of an interposed picker elevator, means for retaining a fixed relation between the lower end of the elevator and rake teeth, and adjusting supports for the upper end of the elevator comprising two levers, with removable means for retaining them in proper position and a shaft for the elevator mounted on the levers beyond the fulcrum point thereof, substantially as described.

In testimony whereof we affix our signatures in presence of two witnesses.

SOLOMON V. REHART.
THOMAS E. BERNARD.

Witnesses as to signature of Solomon V. Rehart:
N. A. ACKER,
W. H. COBB.

Witnesses as to signature of Thomas E. Bernard:
L. F. CONN,
W. A. MASSENGILL.